United States Patent Office 3,585,159
Patented June 15, 1971

3,585,159
COORDINATE-BONDING, CORROSION-PREVENTIVE PAINT
Kazuyuki Mihara, Kunio Kobiyama, and Yukio Yoshida, Tokyo-to, Japan, assignors to Cashew Kabushiki Kaisha, Tokyo-to, Japan
No Drawing. Filed Oct. 25, 1968, Ser. No. 770,829
Claims priority, application Japan, Dec. 29, 1967, 43/84,845
Int. Cl. C08g 5/20, 51/72
U.S. Cl. 260—19
15 Claims

ABSTRACT OF THE DISCLOSURE

A compound of the urushi lacquer class and at least one compound selected from aromatic acids and hydroxy acids and polyvalent phenols are caused to undergo copolycondensation together with Formalin in the presence of an acidic catalyst, and, with the resulting resinous substance, an animal or vegetable drying oil, at least one pigment, and other additives as desired are thoroughly admixed to produce a paint of high corrosion-preventive performance due to its coordinate-bonding characteristic.

BACKGROUND OF THE INVENTION

This invention relates to techniques for preventing corrosion of metals and more particularly to coatings for preventing corrosion of metal surfaces. More specifically, the invention concerns new corrosion-preventive paints and to a process for producing the same.

Cashew nut shell liquid obtained from vegetable cashew (scientific name: anacardium occidentale) produced principally in Brazil and India, is composed of a mixture of approximately 90 percent of anacardic acid and approximately 10 percent of cardol when prepared by a solvent extraction process or a cold press process, but when this nut shell liquid is subjected to treatment such as heating, the anacardic acid undergoes decarboxylation and becomes anacardol.

More specifically, the constituents of this cashew nut shell liquid may be represented by the following formulas.

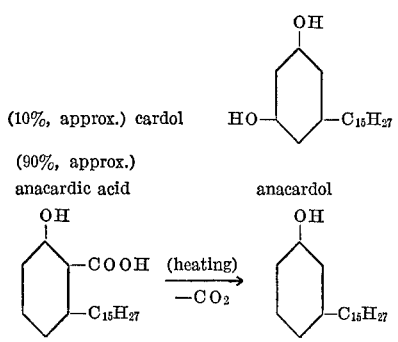

Urushiol is a derivative of catechol which is one kind of dihydric phenol (diphenol or diatomic phenol) and is considered to be composed principally of a constituent representable by the following formula:

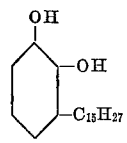

Compounds such as laccol and thitsiol are considered to resemble urushiol in this respect.

Furthermore, the principal constituents of the nut shell liquid of the bhilawan tree (scientific name: *Semecarpas anacardium*) is considered to be semercarpol and bhilawanol, but the exact molecular structure thereof has not yet been confirmed. However, since the properties such as molecular weight of this liquid are similar to those of urushiol, it may be considered to be a mixture of urushiol, anacardol, and cardol.

It is known that these compounds of the Japan lacquer (urushi) class, which are derivatives of monohydric phenol (monophenol or monoatomic phenol) or dihydric phenol react readily with metallic salts to form precipitates. The basic mode of this reaction has been represented by the following formula (from Majima, Toshiyuki, "Tokyo Kagaku Zasshi" (Tokyo Chemistry Magazine), Volume 38, page 113, 1917).

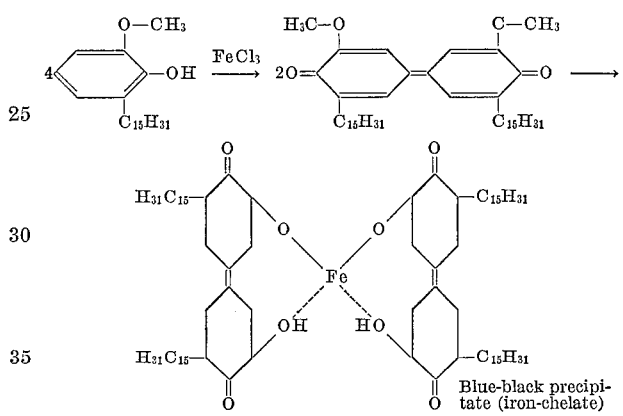

The effectiveness of corrosion-preventive paints known heretofore is almost nonexistent when these paints are applied onto metal surfaces which are already corroded. For this reason, it is necessary to remove completely the products of corrosion (hereinafter referred to as "rust"), and it is the present practice to apply such paints onto metal surfaces after removal of rust therefrom by sandblasting, rubbing with sandpaper or emery cloth, and other mechanical methods. Consequently, the cost of treatment of metal surfaces prior to painting is high, whereby the proportion of the total painting cost relative to the total manufacturing cost of articles thus painted is high.

SUMMARY OF THE INVENTION

It is an object of the present invention to apply the fundamental principle as indicated by the reaction formula set forth hereinabove to corrosion prevention and thereby to provide completely new corrosion-preventive paints which are effective in corrosion prevention when applied onto corroded metal surfaces after only the outer layer of soft surface rust has been removed.

The foregoing object has been achieved by the invention whereby rust is converted into a chelate compound by a resin obtained from compounds of the urushi lacquer class included in the paint composition, and further development of the rust is effectively stopped. Thus, the pretreatment of corroded metal surfaces prior to painting as practiced hereinbefore is greatly facilitated and shortened in time, and the total cost of painting can thereby be greatly reduced.

According to the present invention, briefly summarised, there is provided new corrosion-preventive paints and a process for producing the same, which process comprises causing copolycondensation of a compound of the urushi lacquer class and at least one compound from among aromatic acids, aromatic hydroxy acids, and polyvalent phenols together with Formalin in the presence of an acidic catalyst to prepare a resinous substance, adding thereto a small quantity of an animal or vegetable drying oil or semi-drying oil, and thoroughly kneading the resulting resin together with additives, including one or more pigments thereby to produce a paint characterised in that, upon its being applied as a coating onto clean and/or corroded metal surfaces, the paint undergoes strong coordinate bonding with these surfaces.

The nature, principle, details, and utility of the invention will be more clearly apparent from the following detailed description beginning with general considerations and concluding with specific examples of preferred embodiment of the invention.

DETAILED DESCRIPTION

In general, the corrosion-preventive paints of the invention can be produced by the following procedure.

First, one mol of an urushi lacquer compound which is a derivative of monohydric or dihydric phenol and one mol of an aromatic organic acid, an aromatic hydroxy acid, or a polyvalent phenol are caused to undergo copolycondensation reaction by heating and agitating thereof with an acidic catalyst together with one mol of formaldehyde, a solvent being added if necessary. Example of the aromatic organic acid, aromatic hydroxy acid, and polyvalent phenol are diphenolic acid, benzoic acid, terephthalic acid, pyrocatechin, phloroglucinol, resorcinol, gallic acid, salicylic acid, and protocatechualdehyde.

Next, with 100 parts of the resin thus formed, from 10 to 100 parts of a drying or semidrying oil such as linseed oil, tung oil, and fish oil, either singly or as a mixture of at least two thereof or another oil such as a boiled oil and a stand oil is uniformly mixed, the proportion of the oil being varied in accordance with factors such as the drying property of the oil and the kind of the copolycondensation product at the time of resin synthesis.

Alternatively, in the case where these substances are not mutually soluble, the mixture is cooked at a high temperature to prepare a uniform substance which is used as the paint vehicle. Then, depending on the necessity, colouring pigments, additives, solvents, drying agents, and other substances are caused by kneading with rolls to disperse uniformly throughout the paint vehicle, whereupon the product is obtained.

The purposes for here causing the above mentioned compound selected from among aromatic organic acids, aromatic hydroxy acids, and polyvalent phenols to undergo copolycondensation with an urushi lacquer compound in the presence of an acidic catalyst through the use of Formalin are to obtain an increase in the adhesivity based on the introduction of polar radicals and an increase in permeability accompanying an increase in surface activity with respect to rust, to increase the capability of forming chelates with rust, and to suppress double decomposition reaction.

Furthermore, the admixing of a drying oil, a semi-drying oil, or a mixture thereof improves the paintability, cohesion with respect to the finish coat, weather resistance, dispersion of pigments, and other properties of the resulting paint.

As a result of our research on the copolycondensation product resulting from synthesis through the use of anacardol within cashew nut shell liquid as an urushi compound and salicylic acid as an acid among aromatic organic and hydroxy acids and polyvalent phenols and on the nature of the reaction between the resin and rust when this product is applied as a paint coating on a surface of a mild steel plate which is already rusted, we have arrived at the following formula.

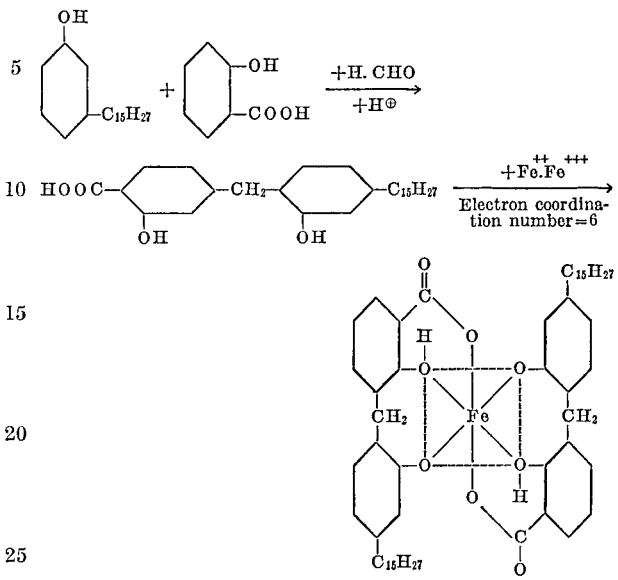

The principal features derived through the practice of the invention as indicated above are as follows.

(1) The adhesivity of the paint with respect to metal surfaces is very high since it is due to coordinate bonding.

(2) The rust-preventive performance of the paint is much higher than those of widely used paints depending on merely rust-preventive pigments since the coated metal surface is transformed into an organic metallic high polymer.

(3) Even when rust is already existing on the metal surface to be coated, since the resin undergoes coordinate bonding in the same manner with the rust to cause transformation thereof, further progress of the rusting is effectively prevented.

(4) The weather resistance or the durability of the coated paint with respect to meteorological effects is excellent.

(5) The chemical resistance of the coated paint with respect to acids and alkalis is excellent since the paint is of the urushi type.

(6) The cohesivity of the coated paint relative to the paint film of a finish coating is excellent.

(7) The colour tone of the paint is freely selectable.

(8) The paint can be readily produced at low cost.

In order to indicate still more fully the nature and utility of the invention, the following examples of preferred embodiment of the invention and results are set forth, it being understood that these examples are presented as illustrative only and that they are not intended to limit the scope of the invention.

EXAMPLE 1

A reaction vessel is charged with 100 parts of cashew nut shell liquid, from 30 to 40 parts of salicylic acid, from 120 to 140 parts of Formalin (37 percent) sold on the market, from 7 to 9 parts of 6 N hydrochloric acid, and from 40 to 45 parts of water, which materials are then caused to react for approximately 4 hours by heating at a temperature of from 90 to 110 degrees C. with agitation.

Thereafter, water in the resulting batch is removed under reduced pressure, and then water is further caused to evaporate off as 30 parts of xylene is added to the process batch. After sufficient water has been removed, the batch is heated for one hour at a temperature of from 130 to 140 degrees C. with agitation to complete the reaction. Thereafter, xylene is added to the resin thus obtained to produce a varnish liquid of a resin content of 60 percent.

With respect to 40 parts of this varnish liquid, 5 parts of a boiled oil sold on the market, 2 parts of red lead, 5 parts of iron oxide powder, 5 parts of talc, and other additives such as a flow-retarding agent are suitably admixed. After the resulting mixture has been thoroughly kneaded by means of rolls, a solvent such as mineral turpentine or xylene is added thereto in an amount to cause the non-volatile content thereof to be of the order of 80 percent, whereupon a rust-preventive paint is obtained.

For painting clean and corroded surfaces of plates and sheets of mild steel, aluminium, and copper with the paint obtained in the above described manner, from 2 to 5 parts of xylene, mineral turpentine, or a mixture thereof is added to 10 parts of the paint to dilute the same, and the diluted paint is applied by spraying or by brushing.

EXAMPLE 2

100 parts of cashew nut shell liquid, from 20 to 30 parts of diphenolic acid, from 100 to 120 parts of Formalin (37 percent) sold on the market, from 7 to 9 parts of 6 N hydrochloric acid, and from 40 to 50 parts of water are charged into a reaction vessel and caused to react for approximately 5 hours at a temperature of from 90 to 130 degrees C. with agitation.

Thereafter, water in the batch thus obtained is removed under reduced pressure, and then water is further caused to evaporate off as 30 parts of xylene is added to the process batch. After sufficient water has been thus removed, the batch is heated for 2 hours at a temperature of from 130 to 140 degrees C. with agitation to complete the reaction. Xylene is then added to the batch to produce a varnish liquid of a resin content of 60 percent.

TABLE 1.—RESULTS OF TESTS ON PRODUCTS ACCORDING TO EXAMPLE 1 OF THE INVENTION

| Value or test | Coated plate | | | |
| --- | --- | --- | --- | --- |
| | Mild steel | Rusted mild steel | Corroded copper | Aluminium |
| Film thickness (micron) | 50 | 60 | 50 | 60. |
| Bending test (3 mm. diam.) | No abnormality | No abnormality | No abnormality | No abnormality. |
| Impact test (¼", 50 cm., 500 g.) | do | do | do | Do. |
| Brine spray test (35° C.) | 1,000 hrs., no abnormality. | 900 hrs., no abnormality. | 2,000 hrs., no abnormality. | 3,000 hrs., no abnormality. |
| Outdoor exposure test | 1.5 yrs., no abnormality. | 1.5 yrs., no abnormality. | 1.5 yrs., no abnormality. | 1.5 yrs., no abnormality. |
| Immersion in boiling water | 2 hrs., no abnormality | 2 hrs., no abnormality | 2 hrs., no abnormality | 2 hrs., no abnormality. |
| Immersion in 10% $H_2SO_4$ solution (20° C.)* | 30 days | 30 days | 30 days | 30 days. |
| Immersion in 5% NaOH solution (20° C.)* | do | do | do | Do. |
| Immersion in 3% NaCl solution (20° C.)* | 6 months | 6 months | 6 months | 6 months. |
| Pencil hardness | H | H | H | H. |

NOTE.—Results of tests marked * are in units of time duration of tests during which no abnormalities were observed.

TABLE 2.—RESULTS OF TESTS ON PRODUCTS SOLD ON THE MARKET

| Value or test | Paint | | |
| --- | --- | --- | --- |
| | 70% red lead primer | Epoxy zinc-rich paint | Lead suboxide antirust paint |
| Film thickness (micron) | 70 | 70 | 70. |
| Pencil hardness | 4B | H | 4B. |
| Bending test (3 mm. diameter) | No abnormality | No abnormality | No abnormality. |
| Impact test (¼", 50 cm., 500 g.) | Few cracks | Few cracks | No abnormality. |
| Brine spray test (35° C.) | 500 hrs. corrosion | 300 hrs. corrosion | 700 hrs. corrosion. |
| Outdoor exposure test | 1.0 year, no abnormality | 6 months, no abnormality | 6 months, no abnormality. |
| Immersion in boiling water* | 10 minutes | 1 hour | 10 minutes. |
| Immersion in 10% $H_2SO_4$ solution (20° C.)* | 1 hour | 10 minutes | 1 hour. |
| Immersion in 5% NaOH solution (20° C.)* | Dissolved after 5 mins | Dissolved after 10 mins | Dissolved after 5 mins. |
| Immersion in 10% NaCl solution (20° C.) | 30 days | 20 days | 30 days. |

NOTE.—Results of tests marked * are in units of time duration of test during which no abnormalities were observed.

In an actual instance of practice, painted test specimens were prepared by painting pieces of the above mentioned metals with clean and corroded surfaces in accordance with the above described procedure and then drying by leaving the painted test specimens for 48 hours at room temperature to dry. These test specimens were then subjected to various tests as indicated in Table 1, the results of which are also shown in the same table. For comparison, the same tests were carried out on similar test specimens coated with conventional products sold on the market, whereupon the results indicated in Table 2 were obtained.

Then, with the same blending recipe as in Example 1, a paint is prepared and kneaded thoroughly by means of rolls.

The coating performance of a rust-preventive paint produced in the above described manner in an actual instance of practice is indicated in Table 3.

TABLE 3.—RESULTS OF TESTS ON PRODUCT OF EXAMPLE 2 OF THE INVENTION

| Value or test | Coated plate | | | |
| --- | --- | --- | --- | --- |
| | Mild steel | Rusted mild steel | Corroded copper | Aluminium |
| Film thickness (micron) | 50 | 60 | 50 | 50. |
| Pencil hardness | H | H | H | H. |
| Bending test (3 mm. diameter) | No abnormality | No abnormality | No abnormality | No abnormality. |
| Impact test (¼", 50 cm., 500 g.) | do | do | do | Do. |
| Brine spray test * | 1,050 hours | 1,000 hours | 2,000 hours | 3,000 hours. |
| Outdoor exposure test * | 1.5 years | 1.5 years | 1.5 years | 1.5 years. |
| Immersion in boiling water * | 2.5 hours | 2.5 hours | 2.5 hours | 2.5 hours. |
| Immersion in 10% $H_2SO_4$ solution (20° C.)* | 30 days | 30 days | 30 days | 30 days. |
| Immersion in 5% NaOH solution (20° C.)* | do | do | do | Do. |
| Immersion in 3% NaCl solution (20° C.) * | 6 months | 6 months | 6 months | 6 months. |

NOTE.—Results of tests marked * are in units of time duration of test during which no abnormalities were observed.

EXAMPLE 3

100 parts of bhilawan nut shell liquid, from 30 to 35 parts of resorcinol, from 100 to 120 parts of Formalin (37 percent) sold on the market, from 7 to 9 parts of 6 N hydrochloric acid, and from 40 to 45 parts of water are charged into a reaction vessel and caused to react for approximately 4.5 hours at a temperature of from 90 to 100 degrees C. with agitation.

Thereafter, water in the batch thus obtained is removed under reduced pressure, and then water is further caused to evaporate off as 30 parts of xylene is added to the process batch. After water has been sufficiently removed, the batch is heated for 3 hours at a temperature of from 120 to 130 degrees C. with agitation to complete the reaction. Xylene is then added to the batch to form a varnish liquid of a resin content of 60 percent. Then, with the same blending recipe as in Example 1, a paint is prepared and thoroughly kneaded by means of rolls.

The coating performance of a rust-preventive paint actually produced in accordance with the above described procedure is indicated in Table 4.

TABLE 4.—RESULTS OF TESTS ON PRODUCT OF EXAMPLE 3 OF THE INVENTION

| Value or test | Coated plate | | | |
|---|---|---|---|---|
| | Mild steel | Rusted mild steel | Corroded copper | Aluminium |
| Film thickness (micron) | 50 | 60 | 50 | 50. |
| Pencil hardness | 2H | 2H | 2H | 2H. |
| Bending test (3 mm. diameter) | No abnormality | No abnormality | No abnormality | No abnormality. |
| Impact test (¼", 50 cm., 500 g.) | do | do | do | Do. |
| Brine spray test (35° C.) * | 950 hours | 950 hours | 2,000 hours | 3,000 hours. |
| Outdoor exposure test * | 1 year | 1 year | 1 year | 1 year. |
| Immersion in boiling water * | 1 hour | 1 hour | 1 hour | 1 hour. |
| Immersion in 10% $H_2SO_4$ solution (20° C.) * | 2 months | 2 months | 2 months | 2 months. |
| Immersion in 5% NaOH solution (20° C.) * | do | do | do | Do. |
| Immersion in 3% NaCl solution (20° C.) * | 6 months | 6 months | 6 months | 6 months. |

NOTE.—Results of test marked * are in units of time duration of test during which no abnormalities were observed.

EXAMPLE 4

100 parts of natural urushi (Japan lacquer), 30 parts of terephthalic acid, 120 parts of Formalin (37 percent) sold on the market, 10 parts of 6 N hydrochloric acid, from 40 to 45 parts of water, and 20 parts of normal butanol are charged into a reaction vessel and heated for 15 hours at a temperature of from 110 to 120 degrees C. with agitation.

Thereafter, water in the resulting process batch is removed under reduced pressure, and then water is further caused to evaporate off as 50 parts of xylene is added. After water has been sufficiently removed, the batch is heated to a temperature of from 130 to 140 degrees C., and, after 5 parts of linseed oil has been added thereto, the batch is heated at that temperature for 5 hours with agitation to complete the reaction. Xylene is then added to the batch to form a varnish liquid of a resin content of 60 percent. Then, with the same blending recipe as set forth in Example 1, a paint is prepared and thoroughly kneaded by means of rolls.

The coating performance of a rust-preventive paint actually produced in accordance with the above described procedure is indicated in Table 5.

effect for improving the paint coating film hardness, the state of the coated surface, and other physical properties of the paint film.

What is claimed is:

1. A process for producing corrosion-preventive paints which comprises:

charging a reaction vessel with 100 parts of a first compound selected from the group consisting of cashew nut shell liquid, bhilawan nut shell liquid, and natural urushi lacquer liquid, from 20 to 40 parts of at least one second compound selected from the group consisting of benzoic acid, terephthalic acid, pyrocatechin, phloroglucinol, resorcinol, gallic acid, salicylic acid, and protocatechualdehyde, from 100 to 140 parts of Formalin, from 7 to 9 parts of 6 N hydrochloric acid and from 40 to 45 parts of water; causing the materials thus charged to react at a temperature of from 90 to 130 degrees C. under agitation for a period of from 4 to 15 hours; removing sufficient water from the resulting process batch by a procedure including the addition thereto of from 30 to 50 parts of xylene; heating the resulting batch at a temperature of from 120 to 140 degrees C. for a period of from 1 to 5 hours to form a resinous substance; adding a solvent to said resinous substance to form a varnish liquid having a resin content of the order of 60 percent; adding at least one drying oil, and at least one pigment, to said varnish liquid; kneading the resulting liquid; and adding a solvent to the resulting liquid to adjust the content of the non-volatile component thereof to a value of about 80 percent, all said parts and percentages being by weight.

2. A process for producing corrosion-preventive paints which comprises causing about 100 parts by weight of a first compound selected from the group consisting of cashew nut shell liquid, bhilawan nut shell liquid and natural urushi lacquer liquid and about 20 to 40 parts by weight of at least one second compound selected from the

TABLE 5.—RESULTS OF TESTS ON PRODUCT OF EXAMPLE 4 OF THE INVENTION

| Value or test | Coated plate | | | |
|---|---|---|---|---|
| | Mild steel | Rusted mild steel | Corroded copper | Aluminium |
| Film thickness (micron) | 50 | 60 | 50 | 60. |
| Pencil hardness | 2H | 2H | 2H | 2H. |
| Bending test (3 mm. diameter) | No abnormality | No abnormality | No abnormality | No abnormality. |
| Impact test (¼", 50 cm., 500 g.) | do | do | do | Do. |
| Brine spray test (35° C.) * | 1,600 hours | 1,300 hours | 2,000 hours | 3,000 hours. |
| Outdoor exposure test * | 1 year | 1 year | 1 year | 1 year. |
| Immersion in boiling water * | 1 hour | 1 hour | 1 hour | 1 hour. |
| Immersion in 10% $H_2SO_4$ solution (20° C.) * | 2 months | 2 months | 2 months | 2 months. |
| Immersion in 5% NaOH solution (20° C.) * | do | do | do | Do. |
| Immersion in 3% NaCl solution (20° C.) * | 6 months | 6 months | 6 months | 6 months. |

NOTE.—Results of tests marked * are in units of time duration of test during which no abnormalities were observed.

By the procedures set forth in the foregoing Examples 1 through 4, it is possible also to produce white paint by substituting titanium oxide for the iron oxide powder and red lead as a pigment. We have found that such a substitution causes no observable difference in the rust-preventing performance of the paint as indicated in Tables 1 and 3 through 5.

From this finding it is apparent that, in the paints according to the invention, the rust-preventing effect is imparted by the resin component constituting the vehicle and that the pigments and other ingredients impart a filler group consisting of benzoic acid, terephthalic acid, pyrocatechin, phloroglucinol, resorcinol, gallic acid, salicylic acid and protocatechualdehyde, to undergo condensation together with 100–140 parts by weight of Formalin at a temperature of from 90 to 130 degrees C. in the presence of hydrochloric acid as an acid catalyst to prepare a resinous substance; adding a small quantity of at least one oil selected from the group consisting of an animal oil or a vegetable oil of the semi-drying oil class to said resinous substance thereby to impart fluidity thereto, adding at least one suitable pigment to the resulting material and thoroughly kneading the resulting paint material thereby to produce a paint which, upon being applied as a coating onto metal surfaces and corroded metal surfaces undergoes strong coordinate bonding with said surfaces.

3. A corrosion-preventive paint consisting essentially of a resinous substance prepared by causing about 100 parts by weight of a first compound selected from the group consisting of cashew nut shell liquid, bhilawan nut shell liquid and natural urushi lacquer liquid and about 20 to 40 parts by weight of at least one second compound selected from the group consisting of benzoic acid, terephthalic acid, pyrocatechin, phloroglucinol, resorcinol, gallic acid, salicylic acid and protocatechualdehyde, to undergo condensation together with 100–140 parts by weight of Formalin at a temperature of from 90 to 130 degrees C. in the presence of hydrochloric acid as an acid catalyst to prepare a resinous substance; and a small quantity of at least one oil selected from the group consisting of animal and vegetable oils of the drying oil class thoroughly mixed with said resinous substance, and at least one pigment admixed with said resinous substance and said oil.

4. A composition according to claim 3 wherein the second compound used to prepare the resinous material is benzoic acid.

5. A composition according to claim 3 wherein the second compound used to prepare the resinous material is terephthalic.

6. A composition according to claim 3 wherein the second compound used to prepare the resinous material is pyrocatechin.

7. A composition according to claim 3 wherein the second compound used to prepare the resinous material is phloroglucinol.

8. A composition according to claim 3 wherein the second compound used to prepare the resinous material is resorcinol.

9. A composition according to claim 3 wherein the second compound used to prepare the resinous material is gallic acid.

10. A composition according to claim 3 wherein the second compound used to prepare the resinous material is salicylic acid.

11. A composition according to claim 3 wherein the second compound used to prepare the resinous material is protocatechualdehyde.

12. A composition according to claim 3 wherein oil additive is linseed oil.

13. A composition according to claim 1 wherein the oil additive is linseed oil.

14. A composition according to claim 3 wherein the first material used in the condensation reaction is bhilawan nut shell liquid.

15. A composition according to claim 3 wherein the first material used in the condensation reaction is natural urushi lacquer liquid.

References Cited

UNITED STATES PATENTS

| | | | |
|---|---|---|---|
| 1,725,796 | 8/1929 | Harvey | 260—24 |
| 1,725,797 | 8/1929 | Harvey | 260—19 |
| 2,143,880 | 11/1939 | Hughes | 260—8 |
| 2,317,607 | 4/1943 | Harvey | 260—613 |
| 2,611,715 | 9/1952 | Palmer et al. | 260—19 |
| 2,978,423 | 4/1961 | Tirtiaux et al. | 260—19 |

FOREIGN PATENTS

| | | | |
|---|---|---|---|
| 574,676 | 3/1933 | Germany | 260—19 |

DONALD E. CZAJA, Primary Examiner

W. E. PARKER, Assistant Examiner

U.S. Cl. X.R.

106—14; 117—132